(12) United States Patent
Cheng et al.

(10) Patent No.: US 7,995,470 B2
(45) Date of Patent: Aug. 9, 2011

(54) TRAFFIC CLASS SUPPORT FOR QOS ACTIVATION

(75) Inventors: Mark W. Cheng, San Diego, CA (US); LiangChi (Alan) Hsu, San Diego, CA (US)

(73) Assignee: Nokia Corporation, Espoo (FI)

( * ) Notice: Subject to any disclaimer, the term of this patent is extended or adjusted under 35 U.S.C. 154(b) by 1251 days.

(21) Appl. No.: 10/732,434

(22) Filed: Dec. 10, 2003

(65) Prior Publication Data
US 2004/0156341 A1 Aug. 12, 2004

Related U.S. Application Data

(60) Provisional application No. 60/432,199, filed on Dec. 10, 2002.

(51) Int. Cl.
*H04L 12/26* (2006.01)
*G06F 15/173* (2006.01)
*H04W 72/00* (2009.01)

(52) U.S. Cl. ...... 370/229; 370/252; 709/226; 455/452.2

(58) Field of Classification Search .......... 370/229–232, 370/235–236, 238, 252, 253; 709/223–226; 455/445, 450–453
See application file for complete search history.

(56) References Cited

U.S. PATENT DOCUMENTS

| | | | |
|---|---|---|---|
| 6,169,898 B1 * | 1/2001 | Hsu et al. | 455/432.3 |
| 6,230,005 B1 * | 5/2001 | Le et al. | 455/414.1 |
| 6,377,548 B1 * | 4/2002 | Chuah | 370/233 |
| 6,594,268 B1 | 7/2003 | Aukia et al. | |
| 6,647,265 B1 * | 11/2003 | Olofsson et al. | 455/445 |
| 6,678,248 B1 | 1/2004 | Haddock et al. | |
| 6,708,034 B1 * | 3/2004 | Sen et al. | 455/445 |
| 6,714,515 B1 * | 3/2004 | Marchand | 370/231 |
| 6,728,365 B1 * | 4/2004 | Li et al. | 379/329 |
| 6,765,909 B1 * | 7/2004 | Sen et al. | 370/392 |
| 6,847,610 B1 * | 1/2005 | Suumaki et al. | 370/230.1 |
| 6,987,738 B2 * | 1/2006 | Subramanian et al. | 370/252 |
| 7,532,892 B2 * | 5/2009 | Hoglund et al. | 455/452.2 |
| 2002/0087674 A1 * | 7/2002 | Guilford et al. | 709/223 |
| 2002/0093925 A1 | 7/2002 | Chuah | |
| 2002/0093936 A1 | 7/2002 | Chuah | |

(Continued)

FOREIGN PATENT DOCUMENTS

EP 1 241 911 A2 9/2002

(Continued)

OTHER PUBLICATIONS

3rd Generation Partnership Project; Technical Specification Group Services and System Aspects; QoS Concept and Architecture (Release 5); 3GPP TS 23.107 V5.5.0 (Jun. 2002); 3GPP Organizational Partners, Valbonne, France.

(Continued)

*Primary Examiner* — Kerri M Rose
(74) *Attorney, Agent, or Firm* — Alston & Bird LLP (57) ABSTRACT

Apparatus, and an associated method, for utilizing traffic classes in a CDMA2000, or other packet radio, communication system. Traffic class designations are identified and used pursuant to communication set-up procedures. Depending upon the class identified in the request, allocations of communication resources are made. A traffic class signal generator generates values that identify a requested traffic class, and a formatter formats the traffic class into a message, such as a QoS BLOB that is used to allocate communication resources.

34 Claims, 7 Drawing Sheets

U.S. PATENT DOCUMENTS

| | | | |
|---|---|---|---|
| 2002/0147829 A1 | 10/2002 | Assa et al. | |
| 2003/0039246 A1 | 2/2003 | Guo et al. | |
| 2003/0092421 A1 | 5/2003 | Dolwin | |
| 2004/0085922 A1* | 5/2004 | Herle | 370/328 |

FOREIGN PATENT DOCUMENTS

| | | | |
|---|---|---|---|
| JP | 2002-305764 A | 10/2002 | |
| JP | 2002-305773 | 10/2002 | |

OTHER PUBLICATIONS

Data Service Options for Spread Spectrum Systems, Addendum 3—cdma2000 High Speed Packet Data Service Option 33, TIA Interim Standard, TIA/IS-707-A-3; Telecommunications Industry Association, Arlington, VA, USA.

European Search Report dated Aug. 25, 2010, for European Patent Application No. EP 03 79 6921; 4 sheets.

Fodor, G., et al.; Proposal on new service parameters (wireless hints) in the controlled load integrated service; [online]; [Retrieved on Aug. 13, 2010]; Retrieved from the Internet <URL: http://tools.ietf.org/id/draft-fodor-intserv-wireless-params-01.txt>; XP-002596449; 14 sheets.

Office Action for Japanese Application No. 2008-309696 dated Feb. 15, 2011.

* cited by examiner

ASSUMED BEARER PARAMETERS FOR DIFFERENT CLASSES IN BS

| Traffic Class | Interactive (Web browsing) | Background (File transfer) |
|---|---|---|
| Maximum bit rate (kbps) | 153 | 153 |
| Delivery order | No | No |
| Maximum SDU size (octets) | 1500 | 1500 |
| SDU Information | Not important | Not important |
| Delivery of erroneous SDUs | No | No |
| Residual BER | 1e-6 | 1e-6 |
| SDU error ratio | 1e-5 | 1e-5 |
| Transfer delay (ms) | 500 | 5000 |
| Guaranteed bit rate (kbps) | 130 | 60 |
| Traffic handling priority | as user wish | - |
| Allocation/Retention priority | as user wish | as user wish |

MOBILE STATION QoS BLOB

| FIELD | LENGTH (BITS) |
|---|---|
| 124-1 ASSURED_MODE | 1 |
| 124-2 NON_ASSURED_PRI_ADJ | 0 or 4 |
| 124-3 F_QOS_INCL | 0 or 1 |
| 124-4 F_ASSURED_PRI_ADJ_INCL | 0 or 1 |
| 124-5 F_ASSURED_PRI_ADJ | 0 or 4 |
| 124-6 F_DATARATE_INCL | 0 or 2 |
| 124-7 F_REQ_DATARATE | 0 or 4 |
| 124-8 F_ACC_DATARATE | 0 or 4 |
| 124-9 F_DATALOSS_INCL | 0 or 2 |
| 124-10 F_REQ_DATALOSS | 0 or 4 |
| 124-11 F_ACC_DATALOSS | 0 or 4 |
| 124-12 F_DELAY_INCL | 0 or 2 |
| 124-13 F_REQ_DELAY | 0 or 4 |
| 124-14 F_ACC_DELAY | 0 or 4 |
| 124-15 R_QOS_INCL | 0 or 1 |
| 124-16 R_ASSURED_PRI_ADJ_INCL | 0 or 1 |
| 124-17 R_ASSURED_PRI_ADJ | 0 or 4 |
| 124-18 R_DATARATE_INCL | 0 or 2 |
| 124-19 R_REQ_DATARATE | 0 or 4 |
| 124-20 R_ACC_DATARATE | 0 or 4 |
| 124-21 R_DATALOSS_INCL | 0 or 2 |
| 124-22 R_REQ_DATALOSS | 0 or 4 |
| 124-23 R_ACC_DATALOSS | 0 or 4 |
| 124-24 R_DELAY_INCL | 0 or 2 |
| 124-25 R_REQ_DELAY | 0 or 4 |
| 124-26 R_ACC_DELAY | 0 or 4 |
| 124-27 TRAFFIC_CLASS_INCL | 1 |
| 124-28 TRAFFIC_CLASS | 0 or 4 |

FIG. 6

TRAFFIC CLASSES

| Traffic Class | Description of typical traffic | Value |
|---|---|---|
| Conversational | Two-way, low end-to-end delay, low data loss rate, no layer 2 ARQ, sensitive to delay variations. | 0001 |
| Streaming | Same as conversational, one-way, less sensitive to end-to-end delay. May require high bandwidth. | 0010 |
| Interactive | Two-way, bursty, variable bandwidth requirements, moderate delay, moderate data loss rate correctable in part via layer 2 ARQ. | 0011 |
| Background | Highly tolerant to delay and data loss rate, uses layer 2 ARQ, has variable bandwidth requirements. | 0100 |
| All other values are reserved. | | |

FIG. 7

TRAFFIC CLASS SUPPORT FOR QOS ACTIVATION

CLAIM OF BENEFIT OF PROVISIONAL APPLICATION

This Application claims the benefit of U.S. Provisional Application No. 60/432,199, filed Dec. 10, 2002.

FIELD OF INVENTION

The present invention relates generally to a manner by which to facilitate communications in a radio communication system at a desired QoS (Quality Of Service) level, such as a communication system that provides for high speed data communication services. More particularly, the present invention relates to apparatus, and an associated method, that provides a traffic class parameter for identifying an allowable communication delay.

BACKGROUND OF THE INVENTION

Communication systems are endemic in modern society. Communication of data pursuant to many varied types of communication services is regularly needed. A communication system is used by which to effectuate the communication of data. Due to advancements in communication technologies, new types of communication systems are being developed.

A communication system includes at least a first communication station and a second communication station interconnected by way of a communication channel. Data is communicated by the first communication station, referred to as a sending station, to the second communication station, referred to as a receiving station, by way of the communication channel. Data that is to be communicated by the sending station is converted, if needed, into a form to permit the data to be communicated upon the communication channel. And, the receiving station detects the data communicated upon the communication channel and recovers the informational content thereof.

A radio communication system is a type of communication system. In a radio communication system, a radio channel, defined upon a radio air interface, forms the communication channel interconnecting the sending and receiving stations. Conventional wireline communication systems, in contrast, require the use of fixed, wireline connections extending between the communications stations upon which to define the communication channel.

A radio communication system provides various advantages in contrast to a wireline counterpart. Initial installation and deployment costs associated with a radio communication system are generally less than the costs required to install and deploy a corresponding wireline communication system. And, a radio communication system can be implemented as a mobile communication system in which one or more of the communication stations operable therein is permitted mobility.

A cellular communication system is an exemplary type of mobile radio communication system. Cellular communication systems have been installed throughout significant portions of the populated areas of the world and have achieved wide levels of usage. A cellular radio communication system is a multi-user communication system in which radio communications are provided with a plurality of mobile stations. Telephonic communication of voice and data is effectuable by way of the mobile stations. Mobile stations are sometimes of sizes to permit their convenient carriage by users of the mobile stations.

A cellular radio communication system includes network infrastructure that is installed throughout the geographical area that is encompassed by the communication system. Mobile stations operable in the cellular communication system communicate, by way of radio channels, with base stations that form parts of the network infrastructure of the communication system.

Base stations are fixed-site radio transceivers that are operable to communicate data with the mobile stations. The base stations are installed at spaced-apart locations throughout the geographical area covered by the communication system. Each of the base stations defines a cell, formed of a portion of the geographical area. A cellular communication system is so-called because of the cells that together define the coverage area of the communication system.

When a mobile station is positioned within a cell defined by a base station, communications are generally effectuable with the base station that defines the cell. Due to the inherit mobility of a mobile station, the mobile station might travel between cells defined by different ones of the base stations. Continued communication with the mobile station is provided through communication hand-off procedures between successive ones of the base stations defining the cells through which the mobile station passes. Through appropriate positioning of the base stations, the mobile station, wherever positioned within the area encompassed by the communication system, shall be within communication proximity of at least one base station.

Only relatively low-powered signals need to be generated to effectuate communications between a mobile station and a base station when the base stations are suitably positioned at selected spaced-apart locations. Hand-offs of communication between the successive base stations permit continued communication without necessitating increases in the power levels at which the communication signals are being transmitted. And, because the signals that are generated are all generally of low power levels, the same radio channels are able to be reused at different locations of the cellular communication system. The frequency spectrum allocated to a cellular communication system is thereby efficiently utilized.

A cellular communication system is constructed, generally, to be operable pursuant to an operating specification of a particular communication standard. Successive generations of communication standards have been developed, and operating specifications defining their operational parameters have been promulgated. First-generation and second-generation cellular communication systems have been deployed and have achieved significant levels of usage. Third-generation and successor-generation systems are undergoing development, standardization, and at least with respect to the third-generation systems, partial deployment.

An exemplary third-generation cellular communication system is a system that operates pursuant to the operating protocol set forth in a CDMA2000 operating specification. A CDMA2000 cellular communication system, constructed in conformity with the CDMA2000 operating specification, provides for packet-based data communication services.

Various parameters are identified in communication set-up procedures. For instance, data rates, data loss rates, and delay are each identified in a CDMA2000 cellular communication system. These parameters define, in part, the QoS (Quality Of Service) levels at which communications are effectuated.

Another new-generation cellular communication system, commonly referred to as UMTS (Universal Mobile Telephone Service), also defines QoS levels of service. A UMTS system defines QoS classes as traffic classes. Currently, four different traffic classes are defined; a conversational class, a streaming class, an interactive class, and a background class. Different delay sensitivities are associated with each of the different classes. A conversational class of service is the most delay-sensitive class of service, and the background class is the most delay-insensitive class of service. In general, data communications that must meet tighter delay requirements have higher priorities in scheduling than communications that are permitted to exhibit looser delay requirements.

Analogous traffic classes have, to date, not been utilized in CDMA2000 cellular communication system operating parameters. Lack of utilization of such parameters, or other analogous parameters, leave communications effectuated in a CDMA2000 communication system at risk of degradation, particularly, with respect to the perspective of radio network resource management.

Mere adoption of the UMTS-defined traffic parameters in a CDMA2000 cellular communication system, however, is inadequate. Quality of service procedures at a mobile station operable in a CDMA2000 communication system are triggered by an application layer, e.g., SIP/SDP (Session Initiation Protocol/Session Description Protocol) quality of service requirements. A mobile station utilizes quality of service parameters included in signaling messages to request the data rate, data loss rate, and delay parameters. From the perspective of the network part of the communication system, scheduling is performed based upon these three quality of service parameters and subscription classes.

Various problems result when traffic class information is not utilized in a CDMA2000 communication system on its radio air interface. First, the base station is unaware of the characteristics of the application that triggers the quality of service set-up procedure. And, some of the quality of service parameters might not be relevant for certain traffic classes. For example, delay and minimum data rate requirements are ignored if the traffic class is a background class. Consequently, the base station is unable to utilize this scheduling flexibility without the introduction of traffic classes. Additionally, if a so-called, pro-hop-behavior (PHB) based on a QoS signaling mechanism, e.g., ietfdiffServ is used between the mobile station and base station radio hop, the lack of traffic class as a quality of service parameter might cause a problem of quality of service mapping and signaling at the IP layer on the mobile station.

A manner is thereby required by which to utilize traffic class parameters in a CDMA2000 cellular communication system.

It is in light of this background information related to quality of service parameters used to define quality of service levels for communications effectuated in a cellular communication system that the significant improvements of the present invention have evolved.

SUMMARY OF THE INVENTION

The present invention, accordingly, advantageously provides apparatus, and an associated method, for utilizing traffic class parameters to help define quality of service (QoS) levels by which communication services are effectuated in a CDMA2000 or other radio communication system.

Through operation of an embodiment of the present invention, a manner is provided by which to identify traffic classes as an additional quality of service parameter, in addition to a data rate, data loss rate, and delay parameter to define the quality of service levels by which communications are effectuated in a communication session. Quality of service management in a CDMA2000 communication station, i.e., mobile station or base station, is defined.

A traffic class is identified and used as a quality of service parameter that is exchanged directly between the mobile station and a base station/radio access network (BS/RAN). When, for instance, the traffic class parameter is provided to the mobile station, resource management entities at the base station are able to make assumptions about the traffic source and to optimize the transport of data for that traffic class.

Various uses are made of the traffic class quality of service parameter. For instance, scheduling and admission control is based on the characteristics of the application, i.e., the traffic class that corresponds to the application pursuant to which the communication of data is to be effectuated. Scheduling is based on the traffic class and can be applied to multiple simultaneous applications or a single user or amongst multiple users. Additionally, mapping of the traffic class into a set of quality of service attributes, i.e., parameters such as data loss, data loss rate, and delay are also performed. For example, under some circumstances, some of the requested quality of service parameters for a specific traffic class are, if desired, ignored or overridden. The traffic class parameter is also used to select the optimal transport mechanism or transport channel to be used to achieve the indicated quality of service when the data communication is effectuated. In addition, the traffic class parameter is used for purposes of DIFF Serv class mapping and marking.

In these and other aspects, apparatus, and an associated method, is provided for identifying traffic classes that define, in part, the quality of service levels pursuant to which communications are effectuated. A traffic class value generator is adapted to receive indications of which of a plurality of traffic classes at which data is to be communicated. The traffic class value generator generates a traffic class value that is applied to a communication set-up procedure signal formatter. The signal formatter formats the received traffic class value in a signal formatted thereat. Once formatted, the signal is communicated pursuant to set-up procedures and is used to allocate resources so as to ensure that the designated quality of service level, identified by the traffic class value, is carried out.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
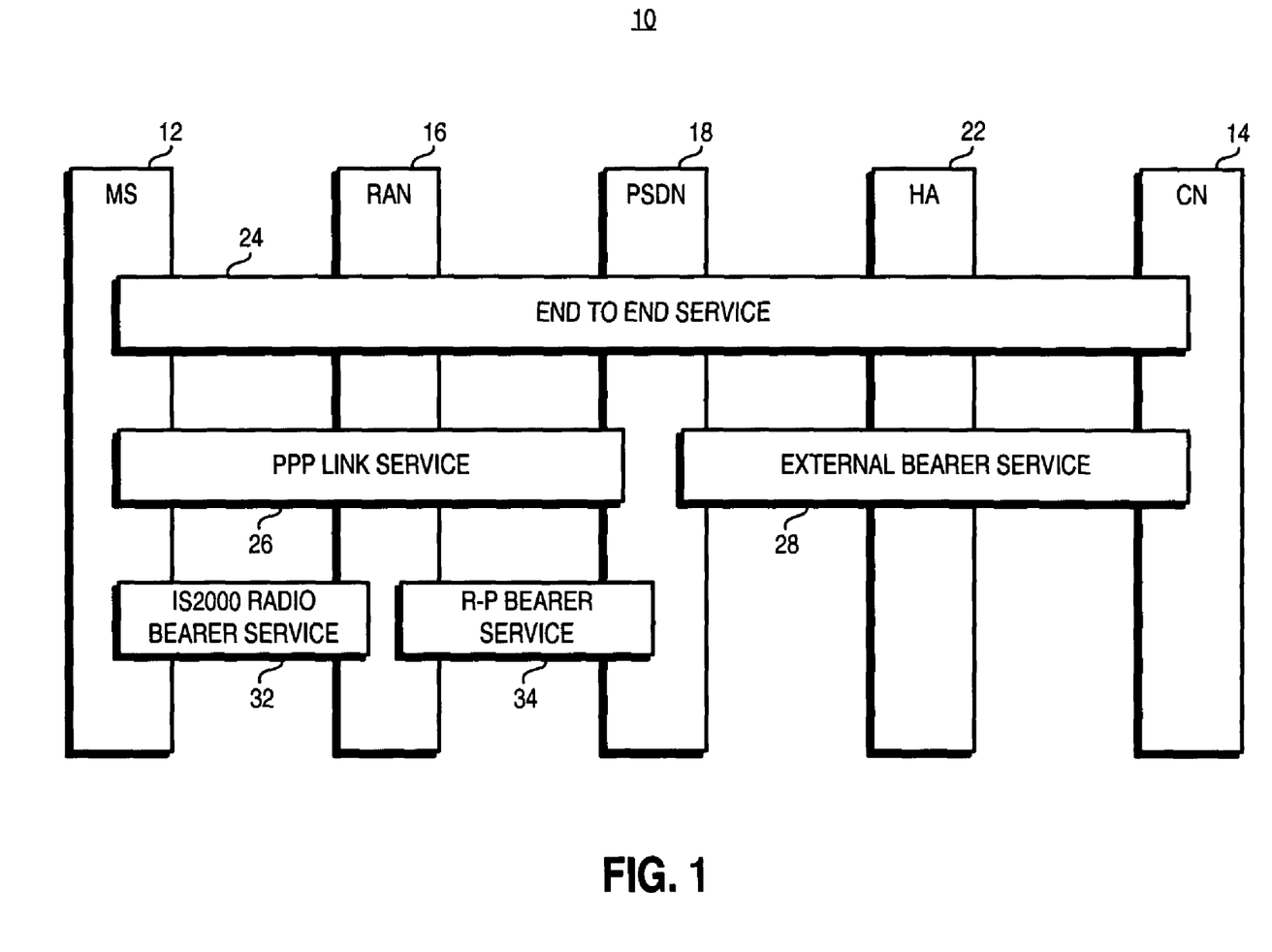
FIG. 1 illustrates a representation of the architecture of a CDMA2000 cellular communication system in which an embodiment of the present invention is operable.

Referring first to FIG. 1, a radio communication system, shown generally at 10, provides for communication of data with a mobile station 12. In the exemplary implementation, the radio communication system forms a cellular communication system operable pursuant to the operating protocols of a CDMA2000 system. While the following description of exemplary operation of the communication system shall be described with respect to its implementation as a CDMA2000 communication system, the teachings of the present invention are analogously applicable in other communication systems, as appropriate.

During operation, communications are effectuated between a mobile station and a correspondent node (CN) 14 by way of network entities, here shown to include a radio access network (RAN) 16, a packet data service node (PDSN) 18, and a home agent (HA) 22.

The data communications between the correspondent node and the mobile station are represented by the end-to-end service block 24. Formed beneath the end-to-end service block 24 are a point-to-point (PTP) link bearer service extending between the mobile station 12 and the PDSN 18, and an external bearer service 28 extending between the packet data service node and the correspondent node 14. An IS-2000 radio bearer service 32 is formed beneath the bearer services 26 and 28. And, a radio link protocol (RLP) bearer service 34 is also formed beneath the bearer services 26 and 28, here formed between the radio access network and the packet data service node.

Each bearer service, i.e., the services 24, 26, 28, 32, and 34, is formed at a specific logical layer. And the represented services are offered using services utilizing the services formed therebeneath. As review of the figure illustrates, the IS-2000 radio bearer service 32 located between the mobile station 12 and the radio access network 16 is located at a lowest layer, and services are offered to the layers formed thereabove. When a communication service is to be effectuated and no radio resource is available, a packet data serving node 18 does not initiate QoS (Quality Of Service) set-up procedures between the mobile station 12 and the correspondent node 14.

Pursuant to operation of an embodiment of the present invention, traffic classes are defined that form part of the quality of service parameters pursuant to which a communication service is to be effectuated. In the exemplary implementation, the traffic class parameter is used together with other parameters, namely, existing data rate, data loss rate, and delay parameters to define together the quality of service at which a communication service is to be effectuated.

As illustrated in FIG. 1, the end-to-end quality of service support consists of several portions of provisions. The first portion is provided first by the IS-2000 radio bearer service 32 and the R-P bearer signaling between the mobile station and the PDSN 18.

FIG. 2 again shows the mobile station 12 and the radio access network 16 that form portions of the communication system 10 shown in FIG. 1. Here, the radio bearer QoS requests, a QoS BLOB (Block of Bits), is sent, as indicated by the segment 42, by the mobile station to the radio access network. And, responsive thereto, the RAN 16 allocates radio resources for a communication session with the mobile station 12 and notifies the mobile station of the radio resource allocation, indicated by the segment 44. The radio access network, or the base station forming a portion thereof, is here the entity that converts the mobile station QoS parameters into air resource QoS parameters. In this exemplary procedure, however, the base station is not aware of the application requirements or the traffic class required for the application, i.e., the communication session in question as the base station is only an intermediate entity of end-to-end communications rather than being an end point of the communications.

Figure 2:
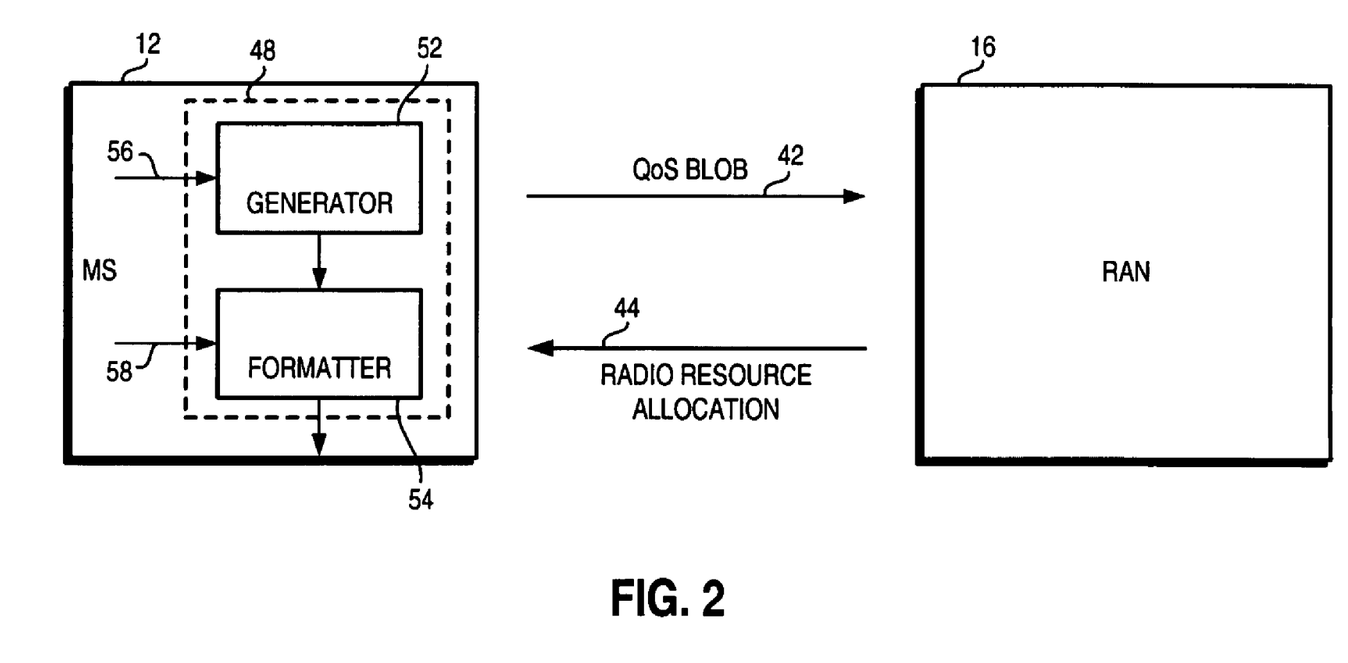
FIG. 2 illustrates a functional block diagram of portions of the CDMA2000 communication system shown in FIG. 1 operable pursuant to an embodiment of the present invention.

The mobile station includes apparatus 48 of an embodiment of the present invention. The apparatus here is formed of functional entities, implementable in any desired manner, such as by algorithms executable by processing circuitry. In the embodiment of FIG. 2, the apparatus 48 includes a traffic class value generator 52 and a communication set-up procedure signal formatter 54. Indications of a desired traffic class are provided to the generator 52 by way of the line 56. Other parameters, such as the delay, data rate, and data loss parameters are provided to the formatter 54 by way of the line 58. Formatted signals formed by the formatter 54 are provided to a transmit part (not separately shown) of the mobile station and are utilized to form the QoS BLOB that is communicated, indicated by the segment 42.

By including the traffic class as a QoS parameter that is exchanged directly between the mobile station 12 and the radio access network 16, (specifically, for example, to the base station forming a portion thereof), resource management at the network, such as may be resident at the base station, is able to make assumptions about the traffic source and optimize the transport for that traffic class. Hence, the base station is able to use the QoS parameter for various purposes. Included amongst the purposes for which the traffic class parameter is used are scheduling and admission control based upon the characteristics of the application, i.e., the traffic class corresponding to the application. Scheduling based upon the traffic class is applied, for instance, to multiple, simultaneous applications for a single user or amongst multiple users. Additionally, the traffic class parameter is used to perform mapping of the traffic class into a set of quality of service attributes, e.g., parameters such as data rate, data loss rate, and delay. For example, under some circumstances, some of the requested quality of service parameters for a specific traffic class are ignored or overwritten. Additionally, the optimal transport mechanism and/or transport channel to fulfill the quality of service requirements are selected. And, the traffic class parameter is used to perform DIFF SERV class mapping and marking.

As just noted, the traffic class parameter is used to perform scheduling and admission control. The base station of the radio access network 16 uses the traffic class parameter together with the subscriber quality of service profile, including other quality of service parameters, to prioritize the mobile applications for its scheduling. The base station also uses the traffic class parameter as an admission control criteria. For example, the base station may allocate twenty-five percent of its resources for conversational traffic support. In this case, when conversational traffic reaches twenty-five percent, the base station rejects subsequent service initiations for the same class to avoid system degradation. At the same time, however, the base station still retains the capacity to admit other classes of communication data.

Also, as mentioned above, the traffic class parameters are used to perform quality of service parameter mappings. The mobile station translates application requirements into a set of quality of service attributes and parameters. This set of attributes and parameters is, e.g., the preferred requirement of the mobile station derived without the knowledge of the current network traffic. The base station also does not have a way to tell of the relative importance between the parameters. For example, of the four traffic classes, conversational, streaming, interactive, and background classes, the data loss rate for a background class is more important than the amount of delay. The base station, however, is not aware of this unless the traffic class is provided.

In an exemplary scenario, two users make a quality of service request with the same delay, data rate, and loss rate, but the requests relate to different traffic classes. Subsequent to the radio resource allocation, if there is a resource constraint, the base station of the radio access network 16 is able to reduce the data rate or to increase the delay of the user that identified a background traffic class in its quality of service request without causing a call to be dropped.

Figure 3:
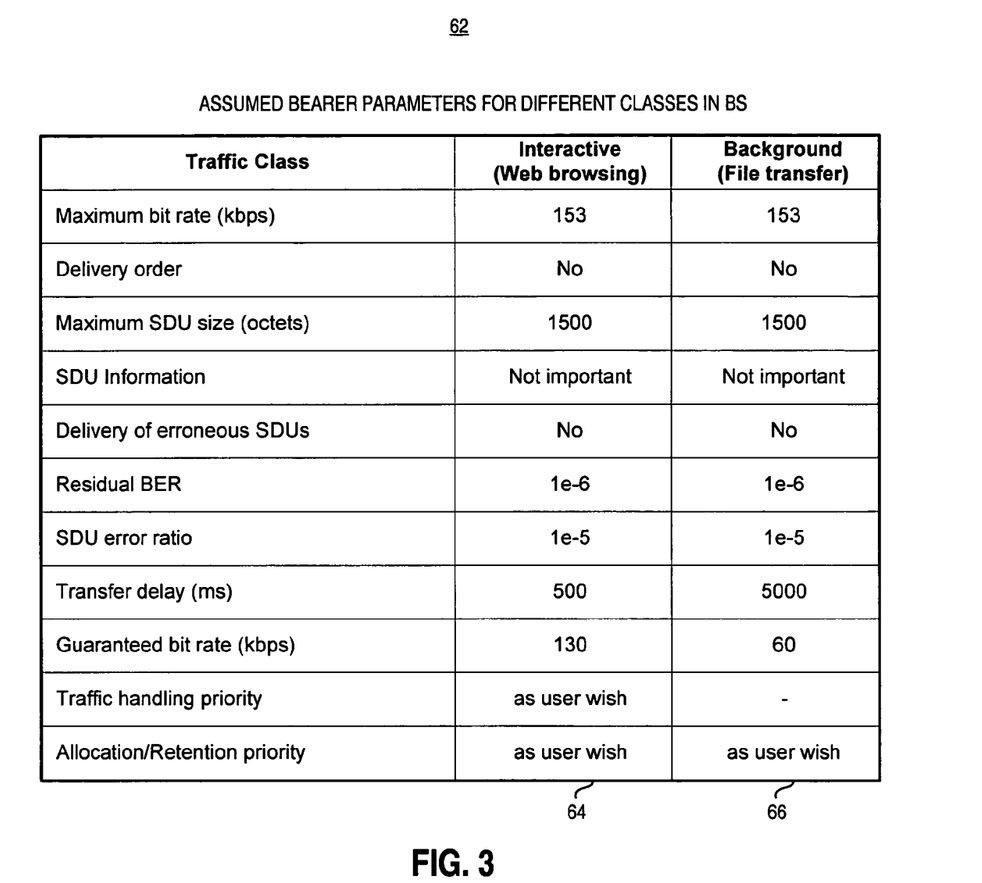
FIG. 3 illustrates a table that lists assumed bearer parameters associated with different service classes used pursuant to an embodiment of the present invention.

FIG. 3 illustrates a table, shown generally at 62, illustrating exemplary bearer parameters for an interactive class and a background class, defining two of the traffic classes used pursuant to an embodiment of the present invention. Here, the bearer parameters for the interactive class of traffic are listed in the column 64, and the parameters of an exemplary background class of traffic are listed in the column 66. Parameters of maximum bit rate, in kpPs, delivery order, maximum STU size, and octets, STU information, delivery of erroneous STUs, residual BER, STU error ratio, transfer delay, guaranteed bit rate, traffic handling priority, and allocation/retention priority parameters are listed for each of the two traffic classes.

Additionally, the base station, or other radio access network entity, uses the value of the traffic class to facilitate selection of the transport channel. The base station has the resources of shared packet data channels and dedicated packet data channels. When the communication service pursuant to which the data is to be communicated forms a 1xEV-DV communication service, the forward packet data channel (F-PDCH) is a shared resource while the forward supplemental channel (F-SCH) is a dedicated resource. For a delay sensitive application, like a conversational traffic class, the base station generally preferably selects use of a dedicated channel to guarantee the fulfillment of the Quality Of Service requirements required of a conversational traffic class. For delay insensitive applications, instead, the base station allocates a shared channel to facilitate resource efficiency. The decision of the resource selection is static or dynamic, as desired. Dynamic selection criteria includes, for instance, the traffic load or the number of active mobile stations, etc.

Figure 4:
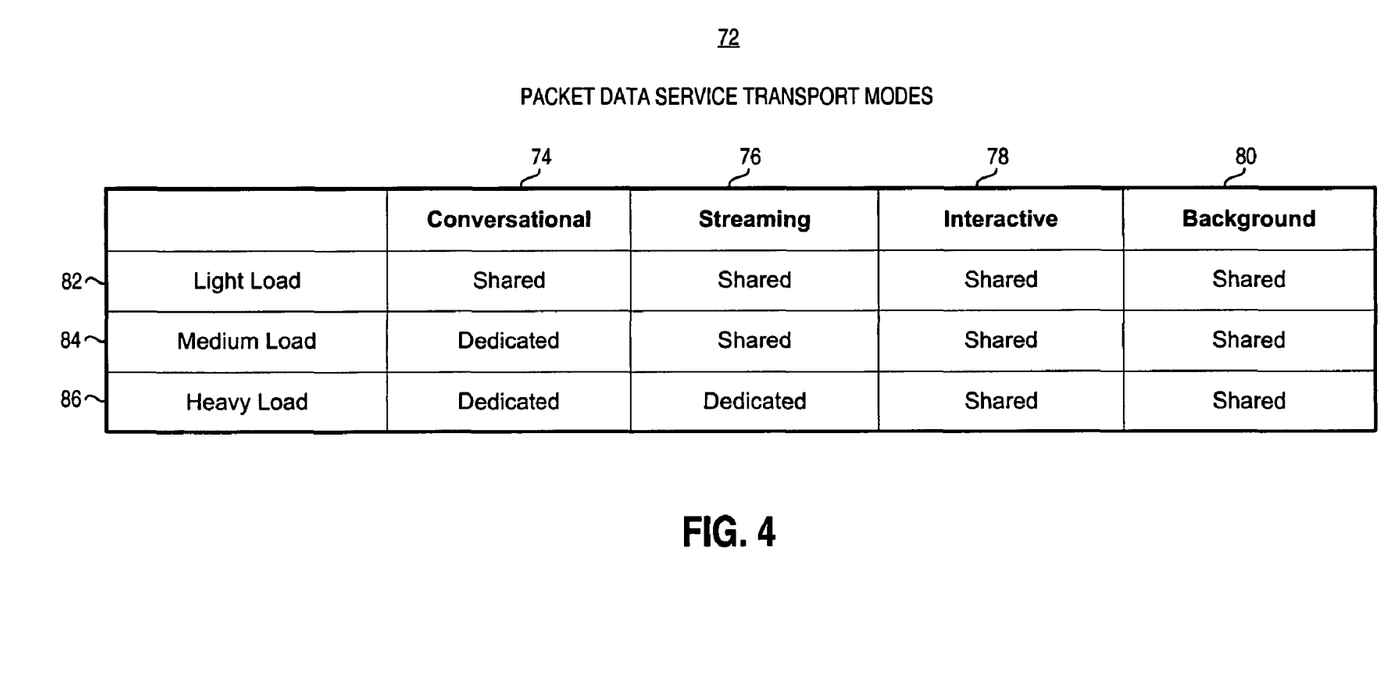
FIG. 4 illustrates a table that defines an exemplary packet data service transport mode defined pursuant to operation of the communication system shown in FIG. 1.

FIG. 4 illustrates an exemplary table 72 listing examples of dynamic decision matrix selections based on the traffic load of a base station scheduler embodied at a base station of the radio access network. The four traffic classes, a conversational class 74, a streaming class 76, an interactive class 78, and a background class 80 are listed in the separate columns, and rows 82, 84, and 86 define light, medium, and heavy load conditions, respectively. Shared or dedicated channels are allocated depending upon the traffic class and the load conditions.

The traffic class is also used to mark the differentiated service model (Diff Serv) class based on the traffic class. The Diff Serv code point (DSCP) information is contained in an IP packet header and is used by Diff Serv capable routers to handle and route IP packets. Mapping of traffic classes to Diff Serv code points facilitates consistency of end-to-end traffic policing and QoS control applied to each data packet and to facilitate more efficient utilization of radio transport resources.

Figure 5:
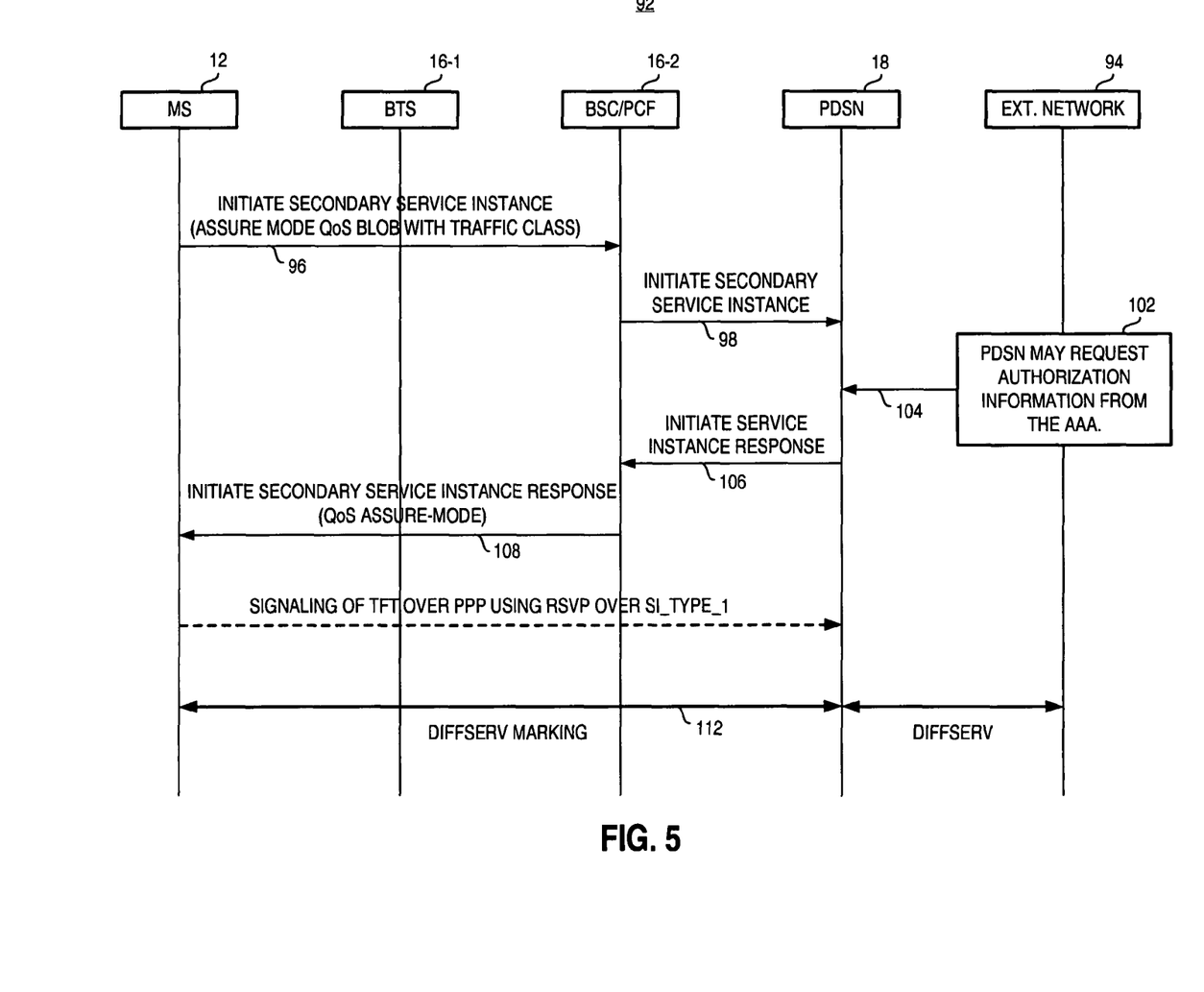
FIG. 5 illustrates a message sequence diagram illustrating exemplary signaling generated during operation of an embodiment of the present invention.

FIG. 5 illustrates a message sequence diagram, shown generally at 92, of signaling generated during operation of the communication system shown in FIG. 1. Here, signaling is generated between the mobile station 12, the radio access network, here shown to include a base transceiver station 16-1 and base station controller/point control function (BSC/PCF) 16-2, packet data service node 18, and an external network 94 is represented. The signaling represents QoS signaling flow for bearer establishment. CDMA2000 link layer signaling is used to establish the secondary service instance.

First, and as indicated by the segment 96, an initiate secondary service instance (assured mode QoS BLOB) with traffic class is sent by the mobile station to the radio access network entity 16-2. The message is based on a request by an application resident at the mobile station, and the mobile station maps the quality of service needs to an assured-mode parameter and requests the secondary service instance activation from the radio access network entity 16-2. The mobile application indicates its traffic class and requested QoS parameter in the QoS BLOB.

Then, and as indicated by the segment 98, the BSC/PCF 16-2 checks whether the mobile station is entitled to use its requested QoS level and if the BSC/PCF has available adequate levels of resources. The BSC/PCF performs internal admission control and resource reservation based upon the QoS attributes and traffic class. The transport mode selection matrix, such as that shown in FIG. 4, is based on the indicated traffic class and mapping from the traffic class to the quality of service attributes, also billed as scheduling references.

In the event that the packet data service node requests authorization information, such information is provided, e.g., by an AAA, indicated at the block 102, and the requested information is returned to the packet data service node 18, indicated by the segment 104. An initiate service instance response is returned to the radio access network entity 16-2, indicated by the segment 106. As just-indicated, the service instance response is based upon the QoS profile and mapping functions and the BSC/PCF authorization of the communication service. And, in turn, the entity 16-2 sends, indicated by the segment 108, an initiate secondary service instance response to the mobile station. Thereafter, a CDMA2000 radio access bearer service is set-up. The base station then makes an R-P connection registration request with the traffic class information to the packet data service node to establish the service instance between the mobile station and the packet data service node. The packet data service node has, for instance, a similar admission control mechanism based upon the traffic class. R-P connection is rejected, e.g., due to a resource shortage for certain traffic classes. Subsequent to establishment of the service instance, the mobile station or packet data serving node starts IP layer DIFF SERV marking, indicated by a segment 112, based upon the traffic class.

Figure 6:
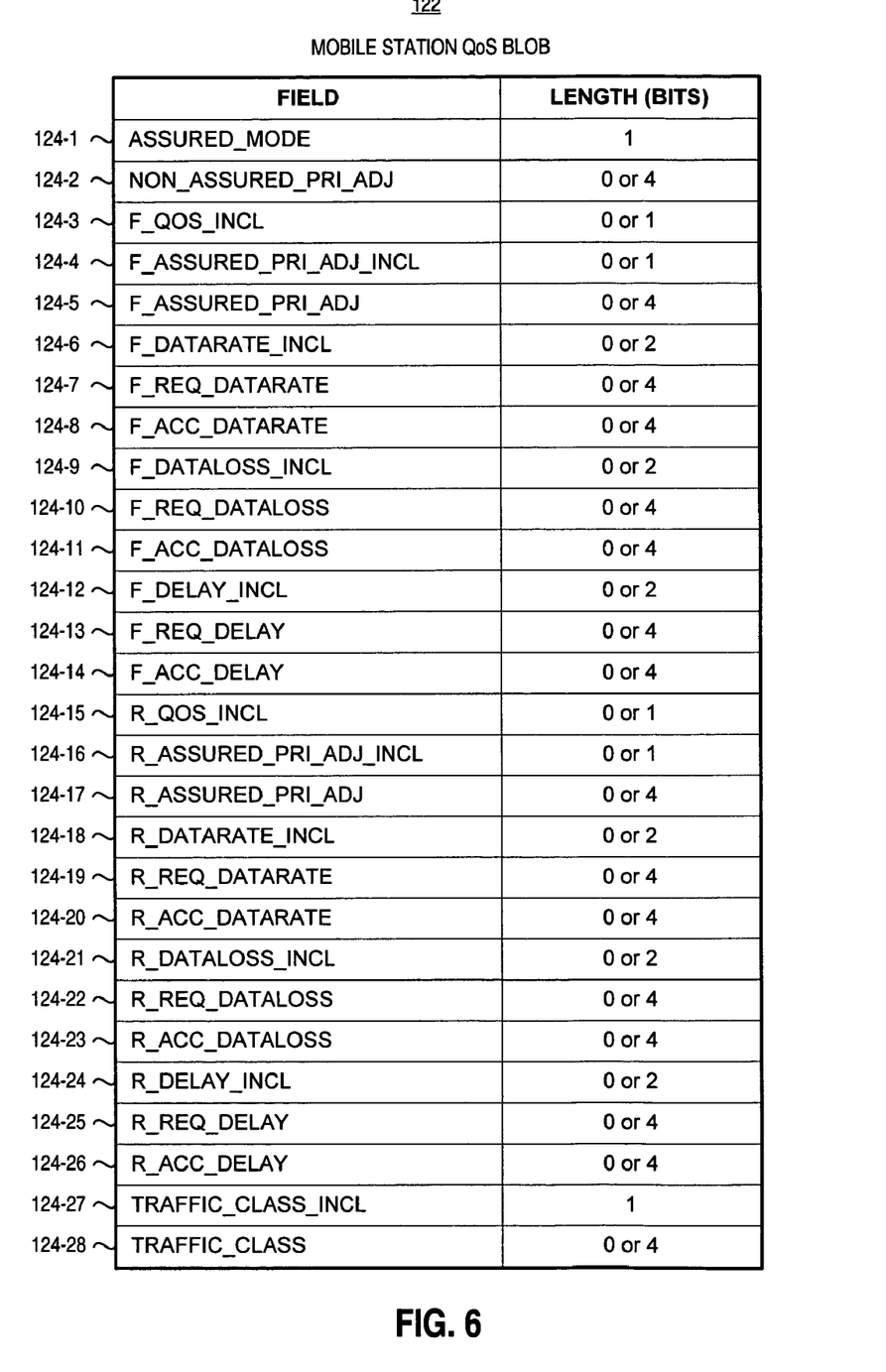
FIG. 6 illustrates a table listing exemplary fields and corresponding field lengths of an exemplary message generated during operation of the communication system shown in FIG. 1.

FIG. 6 illustrates a table, shown generally at 22, representative of the fields of an exemplary mobile station-generated QoS BLOB that includes a plurality of fields 124-1 through 124-28. The fields 124-27 and 124-28 define a traffic_class_INCL and traffic_class parameters, respectively. When the field 124-27 is of a logical one value, traffic class information is included in the field 124-28. And, when the field 124-27 is set to a logical value one, the traffic class field 124-28 is included and set to a selected value to indicate the traffic class type.

Figure 7:
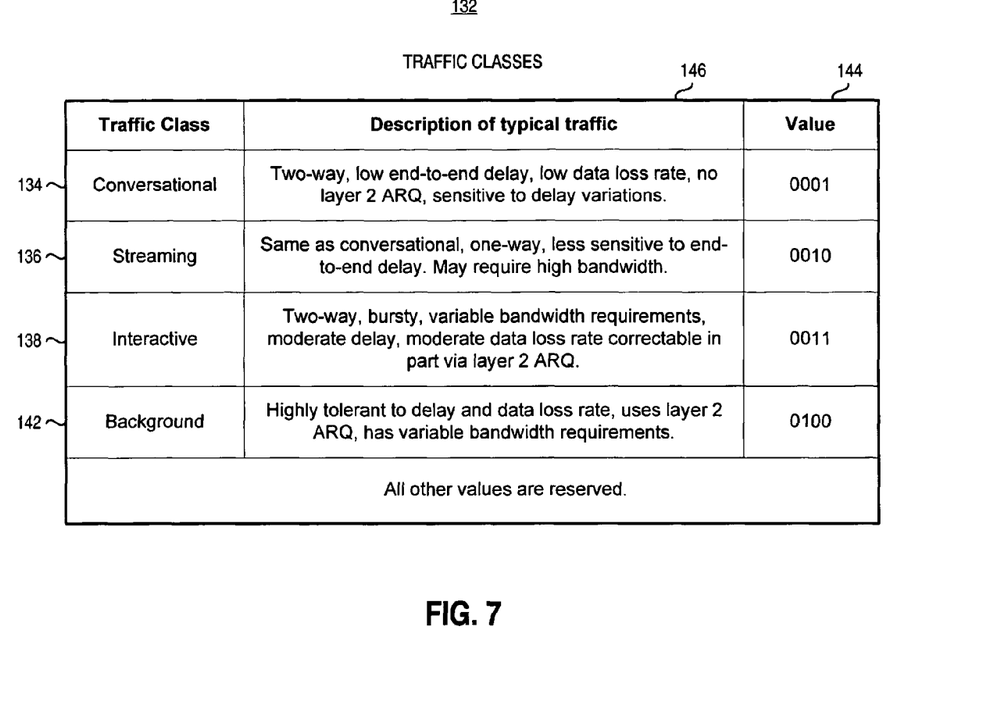
FIG. 7 illustrates a table listing traffic classes defined pursuant to an embodiment of the present invention.

FIG. 7 illustrates a table, shown generally at 132, of exemplary values that populate the field 124-28 shown in FIG. 6.

Four traffic classes, conversational, streaming, interactive, and background classes, 134, 136, 138, and 142, respectively, are identified by four-bit values in the column 144. A description of typical traffic associated with the traffic class types is listed in the column 146.

By making use of the traffic classes, improved allocation of radio resources in a packet radio communication system, such as a CDMA2000 communication system, is provided.

The previous descriptions are of preferred examples for implementing the invention, and the scope of the invention should not necessarily be limited by this description. The scope of the present invention is defined by the following claims.

What is claimed is:

1. An apparatus comprising at least one processor and at least one memory including computer program code, the at least one memory and the computer program code configured to, with the at least one processor, cause the apparatus at least to:
   generate a traffic class value for use in a radio communication system by translating communication requirements of an application to be implemented on the apparatus into at least one parameter including the traffic class value, wherein the generated traffic class value is one within a defined set of traffic class values, each traffic class value within the set being associated with at least a resource allocation and retention priority relative to the other traffic class values within the set;
   include said traffic class value as a parameter in a QoS (quality of service) block to be communicated from a sender of the QoS block; and
   provide for sending said QoS block to a radio access network entity, wherein said QoS block with the traffic class value indicates QoS requirements of said application to said radio access network entity for equipping the radio access network entity to perform admission control internal to the radio access network entity based at least on the resource allocation and retention priority associated with the traffic class value and perform radio resource reservation based at least on the resource allocation and retention priority associated with the traffic class value.

2. The apparatus of claim 1 wherein the radio communication system comprises a CDMA (Code-Division, Multiple-Access) cellular communication system operable to provide, selectably, voice and data services, and wherein selection of said traffic class value is dependent upon which of the voice and data services that is to be communicated.

3. The apparatus of claim 1 wherein said traffic class value comprises a conversational class and wherein said traffic class value corresponds to said conversational class when data is to be communicated at a conversational class level.

4. The apparatus of claim 3 wherein said traffic class value further comprises a streaming class and wherein said traffic class value corresponds to said streaming class when data is to be communicated at a streaming class level, said streaming class level permitting greater communication delay of communication of data than when communicated at said conversational class level.

5. The apparatus of claim 3 wherein said traffic class value further comprises an interactive class and wherein said traffic class value corresponds to said interactive class when data is to be communicated at an interactive class level, said interactive class level permitting a greater data loss rate of data than when communicated at said conversational class level.

6. The apparatus of claim 3 wherein said traffic class value further comprises a background class and wherein said traffic class value corresponds to said background class when data is to be communicated at a background class level, said background class level permitting a greater data loss rate and a greater communication delay than when communicated at said conversational, class level.

7. The apparatus of claim 1 wherein the QoS block comprises a quality-of-service block of bits (QoS BLOB) having said traffic class value as a portion thereof.

8. The apparatus of claim 7 wherein said traffic class value forming part of the QoS BLOB comprises a selected multi-bit field of said QoS BLOB.

9. The apparatus of claim 1 wherein the radio communication system defines a radio bearer layer and wherein said QoS block is sent at said radio bearer layer.

10. The apparatus of claim 1 wherein the radio communication system further comprises mobile stations and said radio access network entity, and wherein said radio access network entity comprises a radio resource manager.

11. The apparatus of claim 10 wherein said radio resource manager selectably allocates radio resources for the communication of data at a selected quality level, said radio resources of an amount, at least in part, dependent upon said traffic class value contained in said QoS block.

12. The apparatus of claim 11 wherein said radio resource manager further utilizes said traffic class value contained in said QoS block to identify at least one additional quality of service attribute.

13. The apparatus of claim 1 wherein said processor is embodied at a mobile station.

14. The apparatus of claim 1, wherein the apparatus caused to provide for sending said QoS block includes being caused to provide for sending said QoS block from the sender of the QoS block to the radio access network entity, the radio access network entity being a radio access network base station.

15. The apparatus of claim 14, wherein the apparatus caused to provide for sending said QoS block includes being caused to provide for wirelessly sending said QoS block directly from the sender of the QoS block to the radio access network entity, wherein the sender of the QoS block is a mobile station.

16. A method comprising:
   generating a traffic class value for use in a radio communication system by translating communication requirements of an application to be implemented on the apparatus into at least one parameter including the traffic class value, wherein the generated traffic class value is one within a defined set of traffic class values, each traffic class value within the set being associated with at least a resource allocation and retention priority relative to the other traffic class values within the set;
   formatting a QoS (quality of service) block, via a processor, to include said traffic class value as a parameter in said QoS block to be communicated from a sender of the QoS block; and
   providing for sending said QoS block to a radio access network entity, wherein said QoS block with the traffic class value indicates QoS requirements of said application to said radio access network entity for equipping the radio access network entity to perform admission control internal to the radio access network entity based at least on the resource allocation and retention priority associated with the traffic class value and perform radio resource reservation based at least on the resource allocation and retention priority associated with the traffic class value.

17. The method of claim 16 wherein the radio communication system further comprises mobile stations and said radio access network entity, and wherein said radio access network entity comprises a radio resource manager.

18. The method of claim 17 further comprising the operation of selectably allocating, by said radio resource manager, radio resources for said application.

19. The method of claim 16 wherein the radio communication system comprises a CDMA (Code-Division, Multiple-Access) cellular communication system operable to provide, selectably, voice and data services, and wherein selection of said traffic class value depends upon which of the voice and data services that is to be communicated.

20. The method of claim 16 wherein said traffic class value comprises a conversational class and wherein said traffic class value corresponds to said conversational class when data is to be communicated at a conversational class level.

21. The method of claim 20 wherein said traffic class value further comprises a streaming class and wherein selection of class value corresponds to said streaming class when data is to be communicated at a streaming class level, said streaming class level permitting greater communication delay of communication of data than when communicated at said conversational class level.

22. The method of claim 20 wherein said traffic class value further comprises an interactive class and wherein selection of traffic class value corresponds to said interactive class when data is to be communicated at an interactive class level, said interactive class level permitting a greater data loss rate of data than when communicated at said conversational class level.

23. An apparatus comprising:
  means for generating a traffic class value for use in a radio communication system by translating communication requirements of an application to be implemented on the apparatus into at least one parameter including the traffic class value, wherein the generated traffic class value is one within a defined set of traffic class values, each traffic class value within the set being associated with at least a resource allocation and retention priority relative to the other traffic class values within the set;
  means for formatting a QoS (quality of service) block to include said traffic class value as a parameter in said QoS block to be communicated from a sender of the QoS block; and
  means for providing for sending said QoS block to a radio access network entity, wherein said QoS block with the traffic class value indicates QoS requirements of said application to said radio access network entity for equipping the radio access network entity to perform admission control internal to the radio access network entity based at least on the resource allocation and retention priority associated with the traffic class value and perform radio resource reservation based at least on the resource allocation and retention priority associated with the traffic class value.

24. The apparatus of claim 23 wherein the radio communication system comprises a CDMA (Code-Division, Multiple-Access) cellular communication system operable to provide, selectably, voice and data services, and wherein selection of said traffic class value is dependent upon which of the voice and data services that is to be communicated.

25. An apparatus comprising at least one processor and at least one memory including computer program code, the at least one memory and the computer program code configured to, with the at least one processor, cause the apparatus at least to perform:
  generate a traffic class value for use in a radio communication system by translating communication requirements of an application to be implemented on the apparatus into at least one parameter including the traffic class value, wherein the generated traffic class value is one within a defined set of traffic class values, each traffic class value within the set being associated with at least a resource allocation and retention priority relative to the other traffic class values within the set;
  include said traffic class value as a parameter in a QoS (quality of service) block to be communicated from a sender of the QoS block;
  provide for sending said QoS block to a radio access network entity, wherein said QoS block with the traffic class value indicates QoS requirements of said application to said radio access network entity for equipping the radio access network entity to perform admission control internal to the radio access entity based at least on the resource allocation and retention priority associated with the traffic class value and perform radio resource reservation based at least on the resource allocation and retention priority associated with the traffic class value; and
  accept a response from said radio access network entity, wherein said response represents at least one allocated QoS parameter indicating allocated resources.

26. The apparatus of claim 25 wherein the radio communication system comprises a CDMA (Code-Division, Multiple-Access) cellular communication system operable to provide, selectably, voice and data services, and wherein selection of said traffic class value is dependent upon which of the voice and data services that is to be communicated.

27. A method comprising:
  generating a traffic class value for use in a radio communication system by translating communication requirements of an application to be implemented on the apparatus into at least one parameter including the traffic class value, wherein the generated traffic class value is one within a defined set of traffic class values, each traffic class value within the set being associated with at least a resource allocation and retention priority relative to the other traffic class values within the set;
  formatting a QoS (quality of service) block, via a processor, to include said traffic class value as a parameter in said QoS block to be communicated from a sender of the QoS block;
  providing for sending said QoS block to a radio access network entity, wherein said QoS block with the traffic class value indicates QoS requirements of said application to said radio access network entity for equipping the radio access network entity to perform admission control internal to the radio access network entity based at least on the resource allocation and retention priority associated with the traffic class value and perform radio resource reservation based at least on the resource allocation and retention priority associated with the traffic class value; and
  accepting a response from said radio access network entity, wherein said response represents at least one allocated QoS parameter indicating allocated resources .

28. The method of claim 27 wherein the radio communication system comprises a CDMA (Code-Division, Multiple-Access) cellular communication system operable to provide, selectably, voice and data services, and wherein selection of said traffic class value is dependent upon which of the voice and data services that is to be communicated.

29. An apparatus comprising at least one processor and at least one memory including computer program code, the at least one memory and the computer program code configured to, with the at least one processor, cause the apparatus at least to perform:

receive a QoS (quality of service) block for a radio communication system at a radio access network entity from a sender of the QoS block, wherein said QoS block comprises parameters including a traffic class value, the traffic class value being generated by translating communication requirements of an application to be implemented on the sender of the QoS block into at least one parameter including the traffic class value, wherein the traffic class value is one within a defined set of traffic class values, each traffic class value within the set being associated with at least a resource allocation and retention priority relative to the other traffic class values within the set;

evaluate said QoS block including the traffic class value;

perform admission control internal to the radio access network entity based at least on the resource allocation and retention priority associated with the traffic class value and perform radio resource reservation based at least on the resource allocation and retention priority associated with the traffic class value to meet at least one of said requirements of said application; and provide for sending a signal to the sender of the QoS block, the signal representing at least one allocated QoS parameter indicating allocated resources.

30. The apparatus of claim 29 wherein the radio communication system comprises a CDMA (Code-Division, Multiple-Access) cellular communication system operable to provide, selectably, voice and data services, and wherein selection of said traffic class value is dependent upon which of the voice and data services that is to be communicated.

31. The apparatus of claim 29, wherein processor configured to perform internal admission control and resource reservation is further configured to identify a maximum delay, a maximum data loss rate, and a minimum bandwidth indicated by the traffic class value, and wherein the processor is further configured to modify at least one of delay, data loss rate, or bandwidth associated with the application while ensuring compliance with the maximum delay, the maximum data loss rate, or the minimum bandwidth indicated by the traffic class value.

32. A method comprising:

receiving a QoS (quality of service) block for a radio communication system at a radio access network entity from a sender of the QoS block, wherein said QoS block comprises parameters including a traffic class value, the traffic class value being generated by translating communication requirements of an application to be implemented on the sender of the QoS block into at least one parameter including the traffic class value, wherein the generated traffic class value is one within a defined set of traffic class values, each traffic class value within the set being associated with at least a resource allocation and retention priority relative to the other traffic class values within the set;

evaluating said QoS block including the traffic class value via a processor;

performing admission control internal to the radio access network entity based at least on the resource allocation and retention priority associated with the traffic class value and performing radio resource reservation based at least on the resource allocation and retention priority associated with the traffic class value to meet the at least one of said requirements of said application; and providing for sending a signal to the sender of the QoS block, the signal representing at least one allocated QoS parameter indicating allocated resources.

33. The method of claim 32 wherein the radio communication system comprises a CDMA (Code-Division Multiple-Access) cellular communication system operable to provide, selectably, voice and data services, and wherein selection of said traffic class value is dependent upon which of the voice and data services that is to be communicated.

34. The method of claim 32, wherein performing internal admission control and resource reservation comprises identifying a maximum delay, a maximum data loss rate, and a minimum bandwidth indicated by the traffic class value and wherein the method further comprises modifying at least one of delay, data loss rate, or bandwidth associated with the application while ensuring compliance with the maximum delay, the maximum data loss rate, or the minimum bandwidth indicated by the traffic class value.

* * * * *